Figure 1:
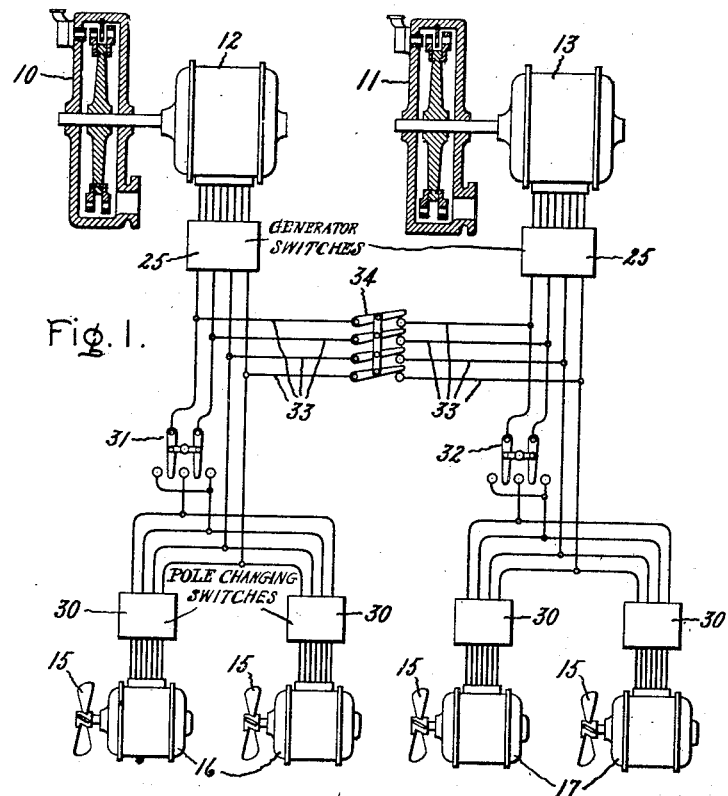

E. F. W. ALEXANDERSON.
SYSTEM OF ELECTRIC SHIP PROPULSION.
APPLICATION FILED SEPT. 3, 1915.

1,289,593.

Patented Dec. 31, 1918.

Inventor:
Ernst F. W. Alexanderson,
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SYSTEM OF ELECTRIC SHIP PROPULSION.

1,289,593.  Specification of Letters Patent.  Patented Dec. 31, 1918.

Application filed September 3, 1915. Serial No. 48,918.

*To all whom it may concern:*

Be it known that I, ERNST F. W. ALEXANDERSON, a citizen of the United States, residing at Schenectady, in the county of Schenectady, State of New York, have invented certain new and useful Improvements in Systems of Electric Ship Propulsion, of which the following is a specification.

My invention relates to systems of electric ship propulsion, and in particular to systems having a plurality of electric current generators delivering energy to a plurality of propeller-driving electric motors. The object of my invention is generally to provide certain improvements in systems of electric ship propulsion. More particularly the object of my invention is to provide a novel and improved arrangement of armature winding and connections for an electric current generator adapted to deliver electric energy to two or more propeller-driving electric motors.

The system of ship propulsion to which my present invention most particularly relates comprises a plurality of turbo-alternators, for example, two. These turbo-alternators may be, and preferably are, located in separate engine rooms, and are both operated for running the ship at full speed. The ship is provided with a plurality of propellers, and merely for the purposes of explanation I will assume that there are four propellers. An alternating current induction motor is connected to the shaft of each propeller, and the electrical connections between the alternators and propeller-driving motors is such that for full speed operation of the ship, each alternator delivers energy only to its proportionate number of motors, while for lower speeds of the ship, where the power required for propulsion is much less than for full speed, a single alternator is employed to deliver energy to all of the propeller-driving motors in parallel. Thus, in the example assumed, each alternator independently delivers energy to two motors for full speed operation of the ship, while one of the alternators alone delivers energy to all of the motors in parallel for low speed operations of the ship. One of the difficulties in making such an equipment most efficient under all conditions lies in the fact that the full speed operation requires the output of both alternators, while low speed operations require the output of only a single alternator. The four motors must, generally, all be operated under all speed conditions, since it is undesirable to have any of the propellers dragged through the water. If an alternator is designed so as to give the best characteristics for operating two motors at full speed, it is not suitable for operating four motors, without increased generator losses and less favorable torque characteristics of the motors. This will be better understood perhaps by remembering that a system of electric ship propulsion is a self contained power plant in which the total capacity of the generators is only slightly in excess of the total maximum power required for navigation. The power required to drive a ship varies substantially as the cube of her speed, and, accordingly, a very much smaller amount of power is needed for propulsion when four motors are connected to a single generator for low speed navigation than when two motors are connected to each generator for full speed navigation. The generator will, therefore, usually operate at a different point on its volt-ampere characteristic curve when delivering energy to four motors for low speed navigation than when delivering energy to two motors for full speed navigation. Thus, if the generator is so designed that its most efficient operation is obtained when supplying energy to two motors, its operation when supplying energy to four motors will be less efficient. For efficient operation with four motors the generator should have other characteristics, and hence a different volt-ampere characteristic curve, than when operating with two motors. The particular object of my present invention is then to provide in a system of electric ship propulsion an electric current generator whose connections can be arranged so as to give satisfactory operating characteristics when connected to two different numbers of propeller-driving electric motors.

In carrying out my invention I provide an electric current generator adapted to operate with a different characteristic curve when delivering energy to all of the propeller-driving motors than when delivering energy to only some of such motors. This result I may accomplish by providing the generator with a plurality of armature circuits and so altering the connections of these circuits that the generator operates on points corresponding to substantially the same ordinate of each characteristic curve when delivering electric energy to either of two different combination of propeller-driving motors. The desired change in the generator connections can be effected by changing the arrangement of the circuits of the armature winding of the generator, so that the terminal voltage of the generator is greater when it is delivering energy to the larger of the two different combinations of propeller-driving motors. Thus, in the particular example and system hereinbefore mentioned, when the ship operates with two generating units, the armature windings of each generator will be arranged for the high voltage connection, and when the ship operates with one generating unit connected to all the motors the armature windings of the operative generator will be arranged for the low voltage connection. By employing the arrangement of my present invention, the effective capacity of the generator when operating alone is greatly increased, and the efficiency under a given condition of load is improved. The generator on its low voltage high current connection is more capable of delivering the large idle current called for by the group of lightly loaded motors, and the difficulty of breaking down motors through shifting of load caused by action of the rotor is very much reduced.

Figure 2:
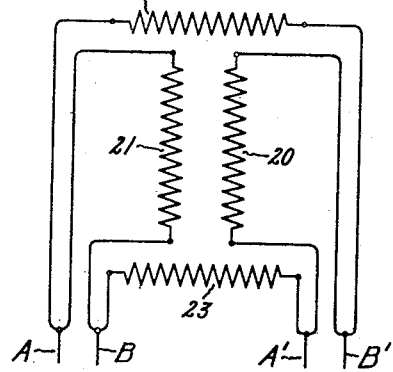
Figure 3:
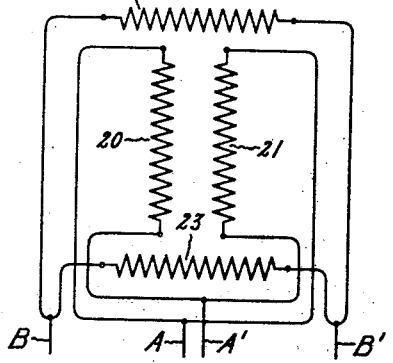
Figure 4:
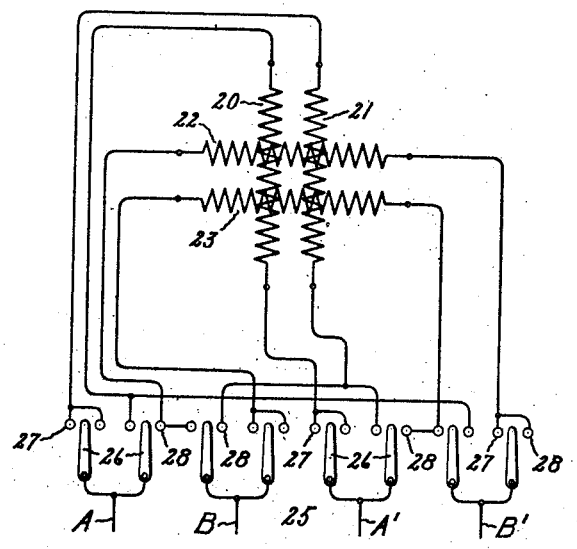

The novel features which I believe to be patentably characteristic of my invention are definitely indicated in the claims appended hereto. The principle of my invention and its embodiment in a system of electric ship propulsion will be understood from the following description taken in connection with the accompanying drawings, in which:

Figure 1 is a diagrammatic view of a system of electric ship propulsion embodying my present invention; and Figs. 2, 3 and 4 are explanatory diagrammatic views.

In Fig. 1 of the accompanying drawings, I have diagrammatically illustrated a system of electric ship propulsion having two generating units. These units are shown as turbo-alternators comprising steam or other elastic fluid turbines 10 and 11 directly coupled to alternating current generators 12 and 13, respectively. The generating units are preferably located in separate engine rooms, and the apparatus of the system may, in general, be similar to that described in Letters Patent of the U. S. of William L. R. Emmet, No. 1,214,528, patented Feb. 6, 1917.

The four propellers 15 of the ship are each driven by an induction motor. For full speed operation of the ship the two motors 16 are electrically connected to the generator 12, while the two motors 17 are electrically connected to the other generator 13. When the ship operates at low speeds the capacity of one generator is sufficient and all four motors are then operated in parallel from either one of the generators.

The alternators 12 and 13 are represented in the drawings as quarter-phase machines. It has been found that quarter-phase alternating currents are peculiarly adapted for systems of electric ship propulsion, since they enable the use of apparatus, such as motors and generators, which can be conveniently designed with particularly desirable characteristics for ship propulsion. It will of course be understood, however, that my invention is in no sense limited to quarter-phase systems, and those skilled in the art will recognize that the principle of the invention may be embodied in any polyphase system. In accordance with my present invention, the armature winding of each of the alternators 12 and 13 has two circuits per phase. Thus in Figs. 2, 3 and 4 of the drawings, the armature winding is diagrammatically represented, and it will be seen that the winding is a quarter-phase winding in which each phase consists of two circuits. Thus, one phase of the alternator consists of the two circuits 20 and 21, while the other phase of the alternator consists of the two circuits 22 and 23. The terminals of the four circuits 20, 21, 22, and 23 are brought out to an eight-blade double-throw switch 25. This switch and the connections of the terminals of the four armature circuits thereto are clearly shown in Fig. 4 of the drawings. The switch blades 26 are represented in Fig. 4 in their "off" position, so that the armature winding of the generator is not connected to the main bus bars. When the switch is thrown so that the blades engage the left hand contacts 27, as viewed in Fig. 4, the armature circuits of each phase will be connected in parallel, as diagrammatically illustrated in Fig. 3. When the switch 25 is thrown so that the blades engage the right hand contacts 28, the armature circuits of the alternator will be connected as diagrammatically shown in Fig. 2. Thus, in the left hand position of the switch 25, the four circuits of the alternator armature winding are connected in pairs in multiple, one pair for each phase, and each phase independent of the other. In the other operative position of the switch 25, the four circuits of the armature winding are connected together in a continuous circuit where each forms one side of a square, of which the pairs of diagonally opposite corners form the terminals of the two phases. The terminal voltage of the alternator is thus changed in the ratio of 1 to $\sqrt{2}$. This is exactly the change in terminal voltage which is necessary to give the alternator the desired characteristic curves for feeding four motors and two motors, respectively. In Figs. 2, 3 and 4, A and A' represent one phase and B and B' the other phase of the quarter-phase circuit.

The change from the square to the parallel connection of the armature winding in a quarter-phase equipment accomplishes the desired result with almost mathematical exactness, whereas such a change in other polyphase systems might be more or less of a compromise. It will of course be understood that other connections may be used for effecting the desired change in the characteristic curve of the alternator, such for example as a change from series to parallel of a plurality of circuits per phase of the armature winding, or a change from star to delta in a 3-phase system. The conditions which make the change from the square to the parallel connection of particular value in a quarter-phase equipment will be best understood by considering the requirements for both conditions of operation and the characteristic curves best suited to meet these requirements. In order to use the equipment to best advantage, the propeller-driving induction motors should be designed so that the maximum power factor of the motors coincides with the maximum output of the alternator. Another requirement is that the maximum output of the combination should be at least 20 per cent. higher than the normal load of the motors. These requirements represent the most favorable operating characteristics under a particular condition. If this condition corresponds to the operation of the alternator with two motors, it is obvious that four motors when connected to the same alternator will have a relation between volts and amperes such that the maximum power factor of the motors occurs at a considerably lower voltage and larger current, and, therefore, considerably below the maximum output of the alternator. If four motors are to be operated from a single alternator in this way so that the combination has a maximum overload margin of 20 per cent., as stated before, this can only be done by allowing the motors to run at less than their normal output and at a much reduced power factor. The stable operation of the motor is at a point where the alternator is close to its maximum KVA output, with 80 per cent. power factor, and therefore a reduction in normal load must be gained at the expense of power factor of the motor. Thus, the operation becomes uneconomical and the load that can be carried in this way is lower than the load for which the alternator is designed. Furthermore, the load would be delivered at a higher current and lower voltage than one for which the alternator is designed, and over-heating of the alternator may be caused for this reason, so as to make it necessary to limit the output still more. All these disadvantages are avoided by using the square parallel connection which changes the alternator characteristics so that the four-motor operation with the parallel connection occurs at a point corresponding to approximately the same ordinate of the characteristic curve of the alternator as the two-motor operation with the square connection.

Aside from the change in economy above explained, an important advantage is gained by the use of the square parallel connection when the maximum current that can be delivered to the motor has the same relation to the normal operating current in the two-motor and the four-motor connection, and, therefore, the starting torque has the same relation to the normal running torque. If the change in connection is not made, the starting current delivered to the motors will be only about 70 per cent. as great, and the starting torque only about half as great. In other words, when one generator is used to operate four motors in parallel, it is to be expected that the normal torque of each motor is one half as great. For successful operation, it would then also be required that the starting torque should be one half as great. This will be the case with the square-parallel connection, whereas, otherwise the starting torque per motor would be only one quarter as great as it is when two motors are operated from one generator.

Each of the propeller-driving motors in the system represented in Fig. 1 of the drawings is provided with a pole changing switch 30. The two motors 16 are provided with a reversing switch 31, while the motors 17 are provided with a similar reversing switch 32. The four outgoing-terminals of each of the switches 25 are connected to bus bars 33. A switch 34 is included in the bus bars. It will thus be seen that when one of the switches 25 is in its "off" position and the switch 34 and the other switch 25 are closed, one of the alternators is electrically connected to the four propeller-driving motors. When the switch 34 is closed, the switch 25 of whichever of the alternators 12 or 13 is to deliver energy to the propeller-driving motors is thrown to its left hand position, thus effecting the connections of the armature circuits of this alternator for delivering energy to the four motors. Whenever the switch 34 is opened, the switches 25 are thrown to their right hand positions, thus making the connections of the alternators 12 and 13 for delivering energy to two motors. Thus, when it is desired to operate the ship at full speed, the switch 34 is opened and the two switches 25 are moved to their right hand positions, Fig. 4. These switching operations may of course be simultaneously made by interlocking if desired. When the ship is to be run at speeds requiring the power of only one generator, the switch 34 is closed and one or the other of the switches 25 is moved to its left hand position, while the other switch 25 is moved to its "off" position. Thus, whenever the switch 34 is closed, one of the switches 25 should be maintained in its "off" position, or in other words neither of the switches 25 should be moved to their right hand positions and only one of the switches should be moved to its left hand position. Throughout this specification and the claims thereof, I have referred to two conditions of operation of the ship, namely, full speed and low speed. It will of course be understood that I have used these terms relatively to describe such navigating speeds as require the capacity of both generators and the capacity of only one generator, respectively.

What I claim as new and desire to secure by Letters Patent of the United States, is:—

1. A system of electric ship propulsion comprising in combination a plurality of alternating current generators, each provided with a plurality of armature windings having relative angular phase displacement, a plurality of propellers, electric motors operatively associated with said propellers, means for electrically connecting certain of said motors to one of said generators for one condition of navigation and for electrically connecting a greater number of said motors to this same generator for a second condition of navigation, and means for changing the electrical connections of the armature circuits of said last mentioned generator so that the generator operates with the characteristic curve of a different vector resultant of the generated voltage when delivering energy for said first condition of navigation than when delivering energy for said second condition of navigation.

2. A system of electric ship propulsion comprising in combination a plurality of alternating current generators, each provided with a plurality of armature windings having relative angular phase displacement, a plurality of propellers, electric motors operatively associated with said propellers, means for electrically connecting certain of said motors to one of said generators for running the ship at full speed and for electrically connecting a greater number of said motors to this same generator for running the ship at low speed, and means for changing the electrical connections of the armature circuits of said last mentioned generator so that the vector resultant terminal voltage of this generator is higher when the smaller number of motors are connected thereto for running the ship at full speed than when the larger number of motors are connected thereto for running the ship at low speed.

3. A system of electric ship propulsion comprising in combination a plurality of quarter-phase electric current generators, a plurality of propellers, induction motors operatively associated with said propellers, means for electrically connecting some of the motors to one generator and the other motors to the other generator or generators for running the ship at full speed and for electrically connecting all of the motors in parallel to one generator for running the ship at low speed, and means for changing the electrical connections of the armature circuits of the last mentioned generator so that the terminal voltage of this generator is $\sqrt{2}$ times as high when delivering energy to only some of the motors as when delivering energy to all of the motors.

4. A system of electric ship propulsion comprising in combination a plurality of propellers, induction motors operatively associated with said propellers, a quarter-phase alternating current generator having an armature winding of two circuits per phase, means for electrically connecting all or only some of the motors to said generator, and a switch adapted in one position to connect the two circuits of each phase of the generator in parallel and in another position to connect the circuits of the generator in the form of a square of which the pairs of diagonally opposite corners form the terminals of the two phases.

5. A system of electric ship propulsion comprising in combination a plurality of propellers, induction motors operatively associated with said propellers, a quarter-phase alternating current generator having a plurality of armature circuits, means for electrically connecting all or only some of the motors to said generator, and means for changing the armature circuits of the generator so that its terminal voltage per phase can be varied in the ratio of 1 to $\sqrt{2}$.

6. A system of electric ship propulsion comprising in combination a plurality of propellers, induction motors operatively associated with said propellers, two quarter-phase alternating current generators, each of said generators having an armature winding of two circuits per phase, means for connecting the armature circuits of each generator in the form of a square of which the pairs of diagonally opposite corners form the terminals of the two phases and for connecting the two armature circuits of each phase of each generator in parallel, and means for electrically connecting half of the motors to one generator and the other half of the motors to the other generator when the armature circuits of the two generators are connected in the form of a square and for connecting all of said motors to one generator alone when the phase circuits of this generator are arranged in parallel.

7. A system of electric ship propulsion comprising in combination a plurality of propellers, induction motors operatively associated with said propellers, two quarter-phase alternating current generators, each of said generators having an armature winding of two circuits per phase, means for connecting the armature circuits of each generator in the form of a square of which the pairs of diagonally opposite corners form the terminals of the two phases and for independently connecting half of the motors to one generator and the other half of the motors to the other generator for running the ship at full speed, and further means coöperating with said last mentioned means for connecting the two armature circuits of each phase of either generator in parallel and for connecting all of the motors to this generator for running the ship at low speed.

In witness whereof, I have hereunto set my hand this 2nd day of September, 1915.

ERNST F. W. ALEXANDERSON.